J. YOUNG.
Cultivator.
No. 24,348.
Patented June 7, 1859.
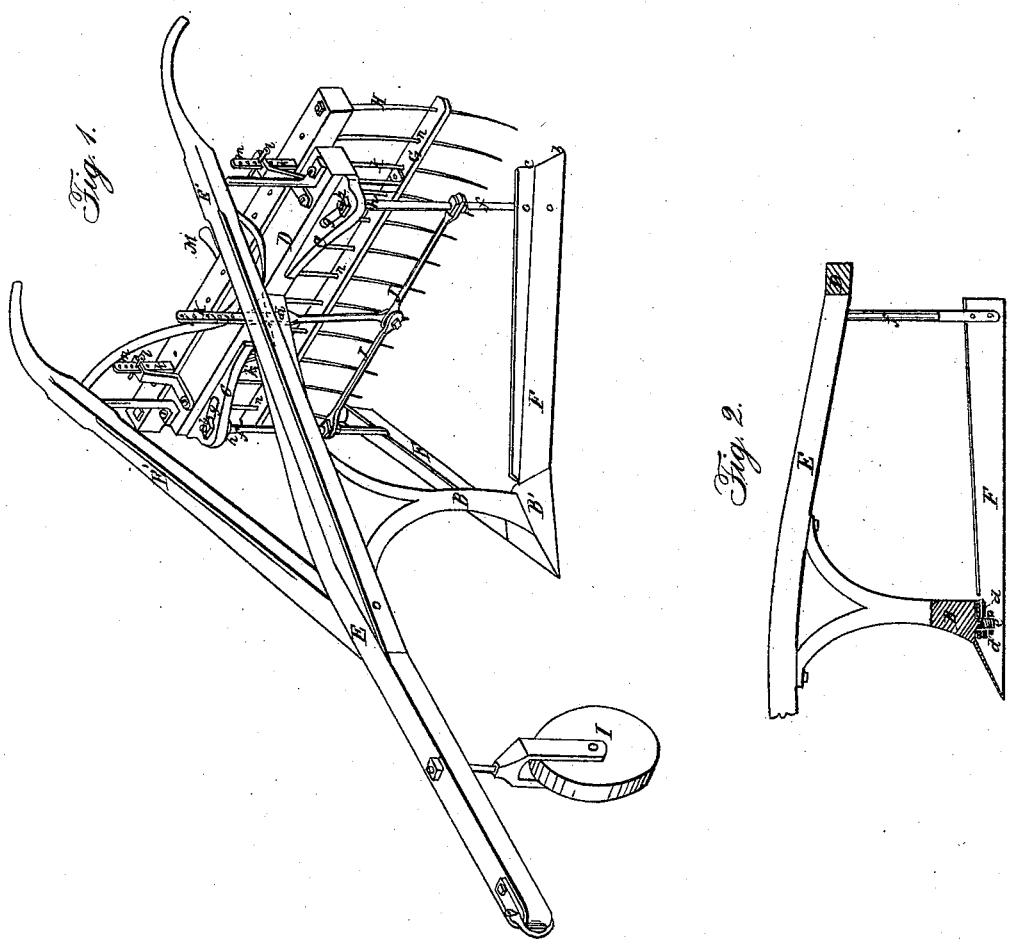

UNITED STATES PATENT OFFICE.

JOHN YOUNG, OF JOLIET, ILLINOIS.

IMPROVEMENT IN CULTIVATORS.

Specification forming part of Letters Patent No. 24,348, dated June 7, 1859.

*To all whom it may concern:*

Be it known that I, JOHN YOUNG, of Joliet, in the county of Will and State of Illinois, have invented a new and useful Improvement in Adjustable Cultivators; and I do hereby declare that the following is a full, clear, and exact description of the same, reference being had to the accompanying drawings, forming a part of this specification, in which—

Figure 1 is a perspective view of my improved adjustable cultivator. Fig. 2 is a vertical section of the same.

Similar letters of reference in each of the several figures indicate corresponding parts.

The nature of my invention consists, first, in the combination of the screw-extension A on the bottom of the standard B with the oblique slotted castings C C, attached to the front side of the cross-bar D of the beam E, whereby the wings or mold-boards F F can be attached at small expense, so as to be adjusted laterally in and out with great convenience to suit rows which are planted at different distances apart.

It consists, second, in the combination of the stationary vertically-perforated bar G with the adjustable rake or harrow H, arranged on a cultivator, as shown, whereby the harrow-teeth can be cleared of all obstruction or substances by simply raising the rake or harrow so that its teeth rise through the vertical perforations in the transverse bar.

To enable others skilled in the art to make and use my invention, I will proceed to describe its construction and operation more minutely.

My cultivator consists of a beam, E, handles E' E', standard B, share B', mold-boards F F, cross-bar D, guide-wheel I, harrow or rake H, and clearing-bar G.

The wings or mold-boards may be straight from *a* to *b*, and thus serve simply for cutting up weeds and conducting them over into the central open space between themselves; or they may have a curved extension, *c*, formed on them, and thus answer for throwing the dirt up against the hills of corn or plants. These mold-boards are each provided with an eye, *d*, so that they may attach to the screw-extension A on the bottom of the standard, and be confined so as to be capable of turning by means of a screw-nut, *e*, as shown. They are also provided with vertical rods *f f*, so that they may attach to the metal castings C C of the cross-bar D, said rods passing up through oblique slots *g g* of the castings and being held in place by clamping-nuts *h h*. These rods may be adjusted in the slots *g g* by means of a toggle-joint, J, and a vertical rod, K, said toggle-joint acting as a brace between the rods and to the wings or mold-boards. To move the wings inward the rod K is raised through the beam and confined by a pin, *i*; to move the wings apart the rod is depressed and confined by the pin *i*, the wings turning on the extension A, and the rod K having a series of adjusting-holes, *j j*, to allow for these adjustments.

The rake or harrow H is hung in brackets *k k* behind the cross-bar D of the beam, so as to be set by means of pins and adjusting holes *l m* to enter the ground a greater or less depth. Its teeth pass down through holes *n n* of a stationary cross-bar, G, which is arranged behind the wings and underneath the rake or harrow head, being suspended by brackets *k' k'* from the cross bar E of the beam, as shown. The harrow is provided with a handle, M, by which it is raised and lowered. When the harrow or rake is raised its teeth pass up through the perforations *n n* till their points rise nearly to the under side of the bar L, and consequently all substances which may be adhering to the teeth are scraped off. By raising and lowering the rake or harrow at intervals its teeth will be kept in good operating condition, and the trash, &c, will be deposited in piles or heaps ready for convenient removal.

This implement will be found very convenient in its arrangement for use on a farm and its utility for cultivating, weeding, and raking or harrowing will be found to equal, if not excel, that of any machine which has preceded it.

What I claim as my invention, and desire to secure by Letters Patent, is—

1. The combination of the screw-extension A on the bottom of the standard B with the oblique slotted castings C C, attached to the front side of the cross-bar D of the beam E, substantially as and for the purposes set forth.

2. The combination of the stationary vertically-perforated bar G with the adjustable rake or harrow H, arranged on a cultivator, substantially as and for the purposes set forth.

The above specification of my improvement in adjustable cultivators signed by me this 20th day of May, 1859.

JOHN YOUNG.

Witnesses:
 G. YORK At LEE,
 H. W. FENWICK.